(12) United States Patent
Kant et al.

(10) Patent No.: US 7,203,100 B2
(45) Date of Patent: Apr. 10, 2007

(54) EFFICIENT IMPLEMENTATION OF A READ SCHEME FOR MULTI-THREADED REGISTER FILE

(75) Inventors: Shree Kant, Union City, CA (US); Kathirgamar Aingaran, Sunnyvale, CA (US); Yuan-Jung D Lin, San Jose, CA (US); Kenway Tam, Cupertino, CA (US)

(73) Assignee: Sun Mircosystems, Inc., Santa Clara, CA (US)

( * ) Notice: Subject to any disclaimer, the term of this patent is extended or adjusted under 35 U.S.C. 154(b) by 105 days.

(21) Appl. No.: 11/040,058

(22) Filed: Jan. 21, 2005

(65) Prior Publication Data

US 2006/0092711 A1 May 4, 2006

Related U.S. Application Data

(63) Continuation-in-part of application No. 10/979,345, filed on Nov. 1, 2004, now Pat. No. 7,136,308.

(51) Int. Cl.
*G11C 7/10* (2006.01)
(52) U.S. Cl. .................. 365/189.01; 365/189.03; 365/189.05
(58) Field of Classification Search .......... 365/189.01, 365/189.03, 189.05, 189.04
See application file for complete search history.

(56) References Cited

U.S. PATENT DOCUMENTS 5,602,781 A * 2/1997 Isobe ............... 365/189.05

| | | | |
|---|---|---|---|
| 5,778,243 A | 7/1998 | Aipperspach et al. ... | 395/800.11 |
| 6,298,431 B1 | 10/2001 | Gottlieb ............. | 712/28 |
| 2003/0051123 A1 | 3/2003 | Takamuki ........... | 712/228 |

FOREIGN PATENT DOCUMENTS

| EP | 0622732 | 11/1994 |
|---|---|---|
| GB | 2286265 | 8/1995 |
| WO | WO 01/53935 A1 | 7/2001 |
| WO | WO 2005/022381 A3 | 3/2005 |
| WO | WO 2005/022384 A1 | 3/2005 |

OTHER PUBLICATIONS

Combined Search and Examination Report Under Sections 17 and 18(3), Jan. 4, 2006 (6 pages).

* cited by examiner

*Primary Examiner*—Anh Phung
*Assistant Examiner*—Dang Nguyen
(74) *Attorney, Agent, or Firm*—Martine Penilla & Gencarella, LLP

(57) ABSTRACT

A multi-threaded memory system including a plurality of entries, each one of the plurality of entries including a plurality of threads, each one of the plurality of threads including an active cell and a shared read cell. The shared read cell has an output coupled to a read bit line and a corresponding plurality of inputs coupled to an output of the corresponding active cells in each one of the plurality of threads. A multi-threaded memory system is also described.

15 Claims, 15 Drawing Sheets

EFFICIENT IMPLEMENTATION OF A READ SCHEME FOR MULTI-THREADED REGISTER FILE

CROSS REFERENCE TO RELATED APPLICATIONS

This application is a continuation in part of and claims priority from U.S. patent application Ser. No. 10/979,345, which was filed on Nov. 1, 2004 now U.S. Pat. No. 7,136, 308, by Kant et al., and entitled "Efficient Method of Data Transfer Between Register Files and Memories," which is incorporated herein by reference in its entirety.

BACKGROUND OF THE INVENTION

1. Field of the Invention

The present invention relates generally to computer memory systems, and more particularly, to methods and systems for reading data from a memory location in a multi-threaded memory system.

2. Description of the Related Art

Computer memory systems are very common and are used in many different configurations. A typical block of memory includes a block of memory cells and input and output circuitry that allows the block of memory cells to communicate with a device or system that is external to the block of memory.

FIG. 1A shows a typical microprocessor 100. The microprocessor 100 includes a first block of memory 110 which includes a block of memory cells 102 and a block of input and output (I/O) circuitry 104. Each one of the memory cells 102 includes a storage circuit 112 (e.g., cross-coupled inverters), one or more keeper circuits 114, and pre-charge circuits 116. The storage circuit 112 stores a selected voltage level that corresponds to a logic value of 1 or 0. The keeper circuits 114 assist the storage circuit 112 in maintaining the selected voltage level. The pre-charge circuits 116 pre-charge the bit lines that are used to read and/or write the voltage level stored in the storage circuit 112.

Typically, the storage circuit 112 stores one of two voltage levels. Typically a low voltage level corresponds to a logical "0" value and a high voltage level corresponds to a logical "1" value. The actual voltage of the high voltage level and the low voltage level is a function of the design (i.e., type) of the storage circuit 112. By way of example, in a first-type of storage circuit 112 a voltage lower than 0.3 volts could be considered a low voltage level and therefore a logical 0. Similarly, a voltage higher than 0.6 volts could be considered a high voltage level and therefore a logical 1 in the first-type storage circuit 112. Conversely, in a second-type storage circuit 112 a voltage greater than 0.3 volts could be considered a high voltage level and therefore a logical 1. Similarly, the second-type storage circuit 112 would require a low voltage level of less than about 0.1 or 0.2 volts to indicate low voltage level that would correspond to a logical 0.

The block of I/O circuitry 104 includes a sense amplifier 122 on the read line and a write amplifier 124 on a write line. The sense amplifier 122 detects the voltage level of the logic stored in the storage circuit 112 and amplifies the detected the voltage level. The sense amplifier 122 can then communicate the voltage level stored in the storage circuit 112 to an external device such as a bus 130. By way of example, the sense amplifier 122 can detect a voltage level that corresponds to a logical 1 (e.g., greater than about 0.3 volts) stored in the second-type storage circuit 112. The circuits external to the first block of memory 110 may be designed to recognize voltage level of about 1 volt to represent a logical 1. Therefore, the sense amplifier 122 amplifies the detected 0.3 volts to about 1 volt so as to accurately transmit the data value stored in the second-type storage circuit 112.

Similarly, the write amplifier 124 detects and amplifies a voltage level on an external device (e.g., bus 130) and communicates the amplified voltage level to the storage circuit 112. By way of example, a logical voltage of about 0.3 volts is detected on the bus 130 by the write amplifier 124. The write amplifier 124 must accurately discriminate whether the detected 0.3 volts represents a logical one or a logical zero. The write amplifier 124 then modifies (e.g., amplify or reduce) the detected 0.3 volt logic value to either a logical 1 voltage level or a logical 0 voltage level that can be accurately stored in the storage circuit 112.

The microprocessor 100 can also include a second block of memory 140 and a processor core 150. The second block of memory 140 and the processor core 150 can also be coupled to the bus 130. The second block of memory 140 includes a second storage circuit 142. As the processor core 150 performs logical operations, it is often necessary to swap the data from the first block of memory 110 to the second block of memory 140 via the bus 130.

FIG. 1B is a flowchart diagram of the method operations 160 of performing the data swap operation from the first memory 110 to the second memory 140. In an operation 162, the sense amplifier 122 must detect the data voltage level stored in the storage circuit 112. In an operation 164, the sense amplifier 122 amplifies the detected data voltage level as described above. In an operation 166, the amplified data voltage level is communicated across the bus 130 to the second block of memory 140. In an operation 168, the write amplifier 124' detects the communicated voltage level on the bus 130. In an operation 170, the write amplifier 124' amplifies the detected voltage level and in an operation 172, the amplified voltage level is stored in the second storage circuit 142.

The method operations 160 of performing the data swap is a very complex and time consuming process as the data voltage level must be amplified and detected multiple times and communicated a relatively long distance across the bus 130. This time consuming process slows down the effective speed of the processor core 150. Further, the sense amplifiers 122 and 122' and write amplifiers 124 and 124' are relatively large devices (e.g., typically more than 50 or even 100 times the device sizes of the devices that form the storage circuits 112 and 142). As a result, the sense amplifiers 122 and 122' and write amplifiers 124 and 124' consume excess space on the semiconductor substrate upon which the microprocessor 100 is formed (i.e., microprocessor die). As is well known in the art, space on the microprocessor die is very precious and reduction of space used by the circuits on the microprocessor die is a constant goal.

Typically, the sense amplifiers 122 and 122', the write amplifier 124 and 124', the keeper circuits 114 and the pre-charge circuits 116 have substantially larger physical size than the devices (e.g., transistors, inverters, PMOS, NMOS, etc.) that form the storage circuit 112. By way of example, the devices that form the storage circuit 112 can have a width of about 0.5 or 0.3 micron or even smaller. In comparison the keeper circuits 114 and the pre-charge circuits 116 can have a width of about 40–50 micron and the sense amplifier 122, the write amplifier 124 can have a width of about 100 micron or greater. These large device sizes 122 and 124 exacerbate the problem by causing the bus 130 (or other interconnecting circuits and conductive lines) to be larger and longer and the memory blocks 110 and 140 further apart and further from the processor core 150. These large device sizes 122 and 124 further limit the number of memory blocks that can be included on the microprocessor 100.

In view of the foregoing, there is a need for a more efficient system and method for moving data between multiple memory blocks.

SUMMARY OF THE INVENTION

Broadly speaking, the present invention fills these needs by providing a system and method for reading data from a multi-threaded memory system through a shared read cell. It should be appreciated that the present invention can be implemented in numerous ways, including as a process, an apparatus, a system, computer readable media, or a device. Several inventive embodiments of the present invention are described below.

One embodiment provides a multi-threaded memory system including multiple entries. Each one of the entries including multiple threads. Each one of the threads including an active cell and a shared read cell. The shared read cell has an output coupled to a read bit line and corresponding multiple inputs coupled to an output of the corresponding active cells in each one of the threads.

The multi-threaded memory system can also include one or more base cells coupled to the active cell. The active cell can be coupled to the corresponding input of the shared read cell through a thread select circuit and wherein the output of the thread select circuit is coupled to the corresponding input of the shared read cell.

The thread select circuit can include a two input gate and wherein the output of the active cell is coupled to a first input of the gate and a thread select signal is coupled to a second input of the gate.

The threads can include at least four threads. The shared read cell can include a gate having an output coupled to a read bit line and corresponding multiple inputs coupled to an output of the corresponding active cells in each one of the threads.

The output of the shared read cell is coupled to one or more read bit lines through one or more output devices. Each one of the one or more output devices can include a two input read bit line select gate and the output of the shared read cell is applied to a first one of the inputs on the read bit line select gate.

A read bit line select signal can be coupled to a second one of the inputs on the read bit line select gate.

Another embodiment provides a microprocessor including a processor core, a bus coupled to the processor core and a multi-threaded memory system coupled to the bus. The multi-threaded memory system includes multiple entries, each one of the entries including multiple threads. Each one of the threads including an active cell. The multi-threaded memory system also includes a shared read cell having an output coupled to a read bit line and corresponding multiple inputs coupled to an output of the corresponding active cells in each one of the threads.

Yet another embodiment provides a method of reading a logic value from an active cell in a multi-treaded memory system. The method including storing a logic value in the active cell, the active cell being included in one of several threads included in each one of several entries. The stored logic value in the active cell is applied to a corresponding input of a shared read cell. The shared read cell includes an input for each active cell in each of the threads in the corresponding one of the entries. The stored logic value is output from the shared read cell to an output circuit.

The active cell can be coupled to the corresponding input of the shared read cell through a thread select circuit. The output of the thread select circuit can be coupled to the corresponding input of the shared read cell.

The thread select circuit can include a two input gate and wherein the output of the active cell is coupled to a first input of the gate and a thread select signal is coupled to a second input of the gate. A thread select signal can be received in the second input of the gate.

The shared read cell can also include a gate having an output coupled to a read bit line and corresponding multiple inputs coupled to an output of the corresponding active cells in each one of the threads. The output of the shared read cell can be coupled to one or more read bit lines through one or more output devices.

Each one of the one or more output devices can include a two input read bit line select gate and the output of the shared read cell is applied to a first one of the inputs on the read bit line select gate. A read bit line select signal can be coupled to a second one of the inputs on the read bit line select gate. A read bit line select signal can be received in the second one of the inputs on the read bit line select gate.

The present invention provides for a faster, smaller area multi-threaded memory read scheme. The present invention also requires fewer conductive tracks to control the multi-threaded memory read scheme.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION OF THE EXEMPLARY EMBODIMENTS

Several exemplary embodiments for reading data output from a shared read cell will now be described. It will be apparent to those skilled in the art that the present invention may be practiced without some or all of the specific details set forth herein.

A novel memory system and method for transferring data between portions of the memory system are described in U.S. patent application Ser. No. 10/979,345, which was filed on Nov. 1, 2004, by Kant et al., and entitled "Efficient Method of Data Transfer Between Register Files and Memories," which is incorporated herein by reference in its entirety, for all purposes.

As described above it is often desirable for a processor to transfer data between two memory locations. By way of example, a processor may be processing a first set of data to a first interim result using a portion of active memory (e.g., an active register). The processor may be unable to fully process the first set of data to achieve a final result because the processor needs a second set of data that is not yet available. As a result, the first interim results and possibly even the first set of data may be transferred from the active register to a second storage location. The processor can then transfer other data to the active register and process the other data to determine the second set of data. Then the second set of data, the first interim results and/or the first set of data can be stored in the active register of the memory and processed to determine the final results.

Figure 1A:
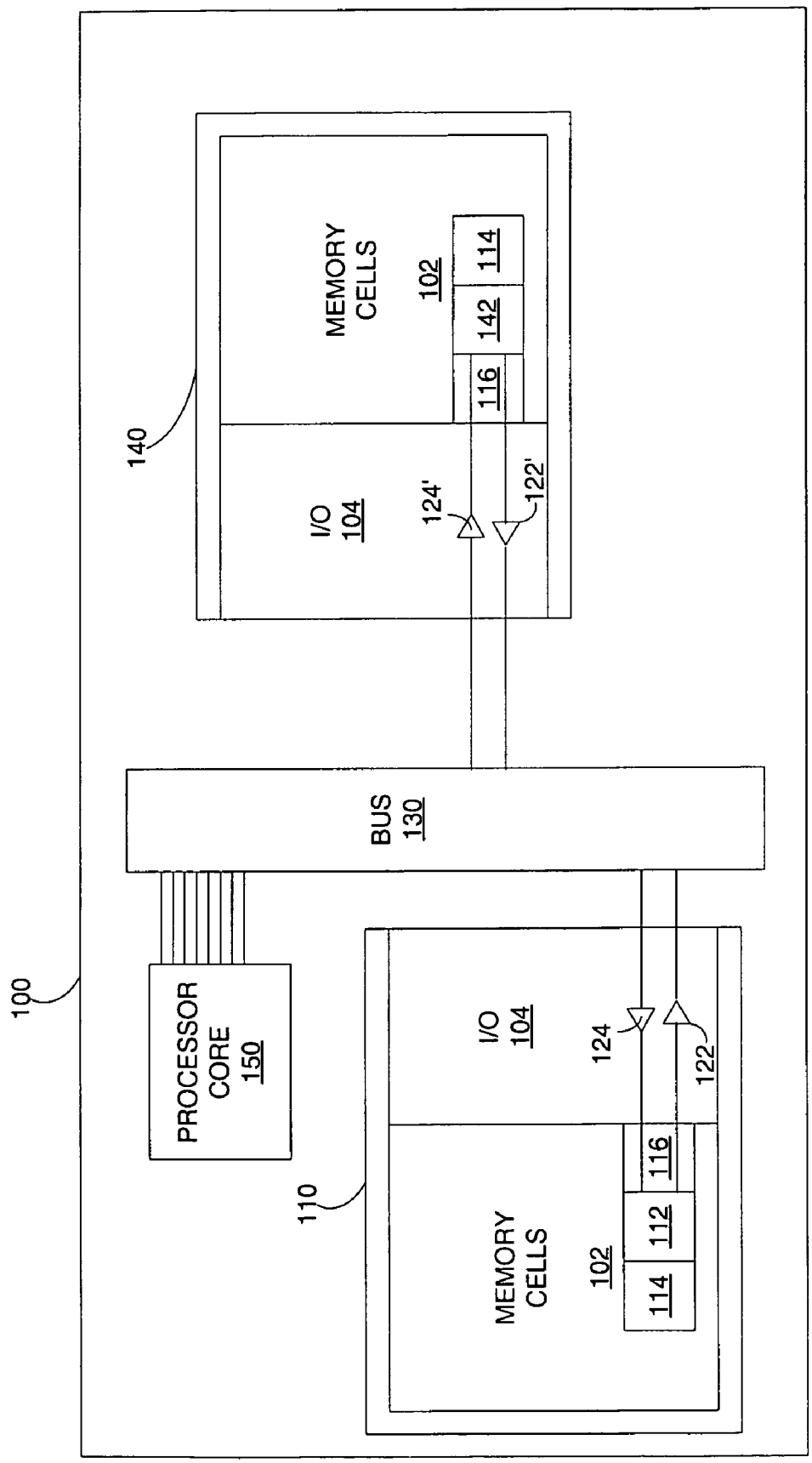
FIG. 1A shows a typical microprocessor.
Figure 1B:
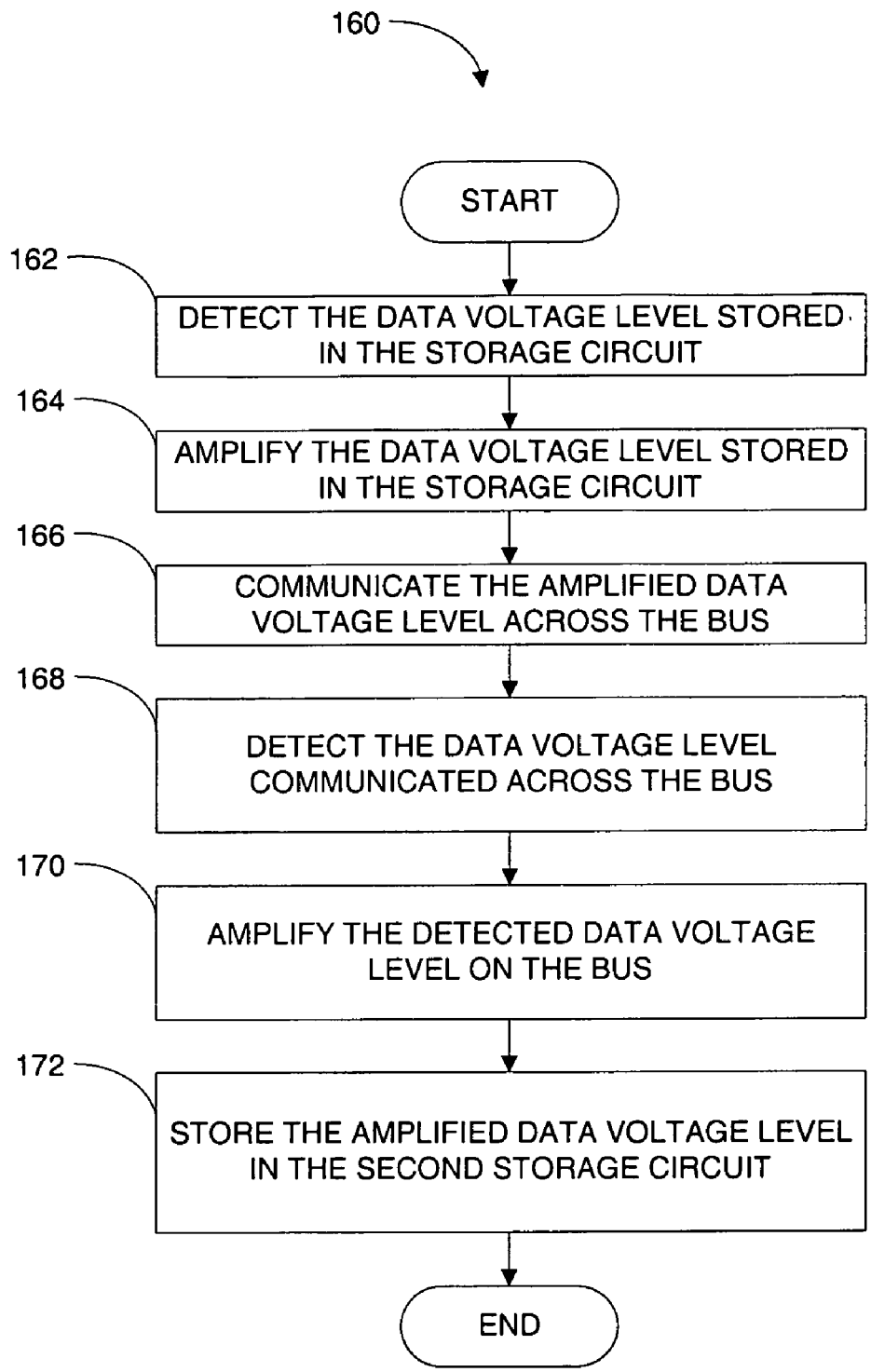
FIG. 1B is a flowchart diagram of the method operations of performing the data swap operation from the first memory to the second memory.
Figure 2:
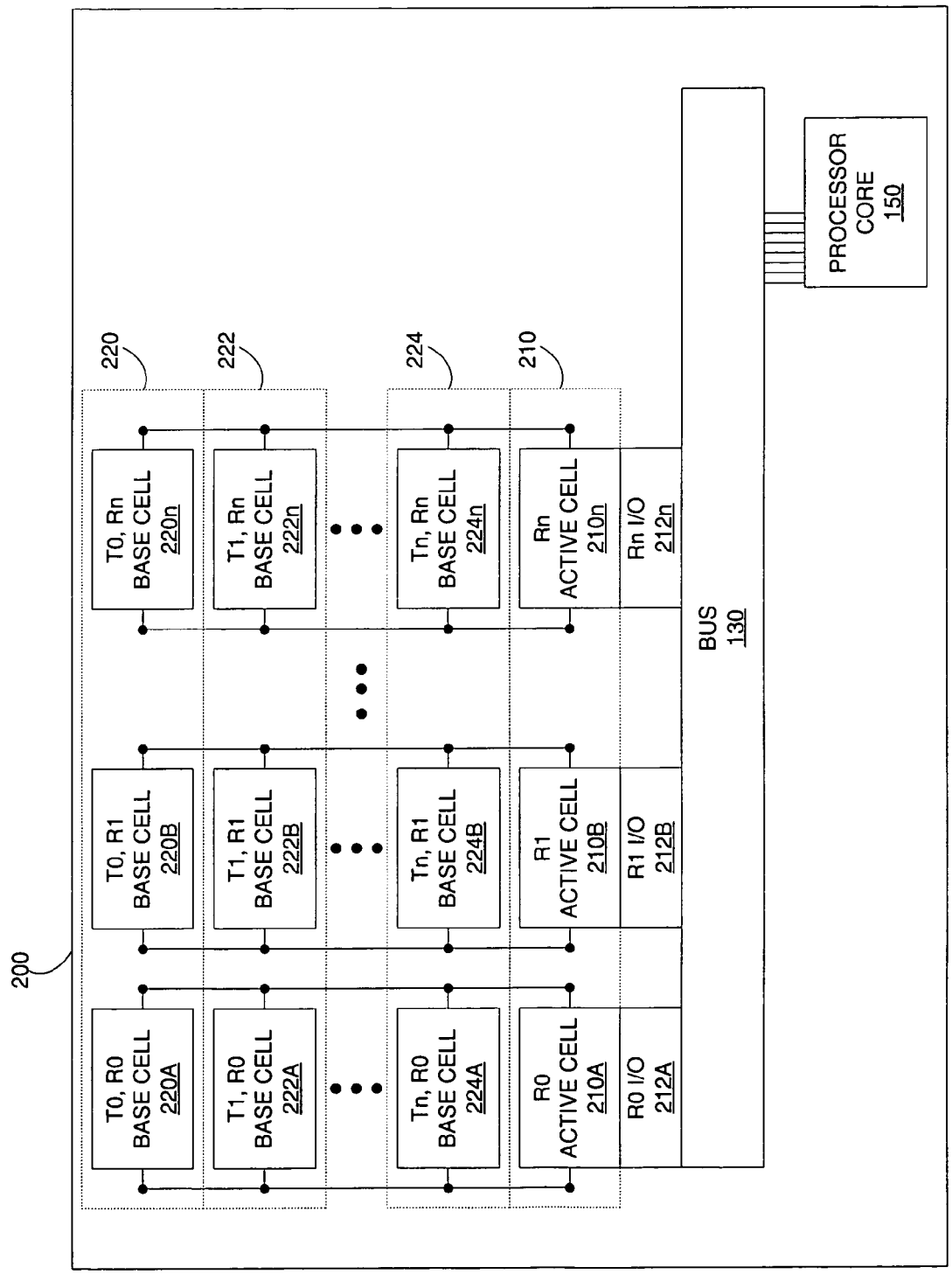
FIG. 2 is a block diagram of a multi-thread processor, in accordance with one embodiment of the present invention.

FIG. 2 is a block diagram of a multi-thread processor 200, in accordance with one embodiment of the present invention. The multi-thread processor 200 includes a processor core 150 that is coupled to a bus 130. An active register 210 includes multiple active cells 210A–210n that represent memory locations R0 through Rn in the register. Each active cell 210A–210n is coupled to the bus 130 by a respective I/O circuit 212A–212n.

The multi-thread processor 200 includes multiple processing threads: Thread 0 (T0) 220, Thread 1 (T1) 222 through Thread n (Tn) 224. The multi-thread processor may have four or eight or even more processing threads. Each of the processing threads 220, 222 and 224 includes a corresponding set of base cells 220A–220n, 222A–222n and 224A–224n. Each active cell 210A–210n is also coupled directly to one base cell in each of the processing threads 220, 222 and 224. By way of example, active cell 210B is coupled directly to base cells 220B, 222B and 224B in each of the processing threads 220, 222 and 224.

Figure 3:
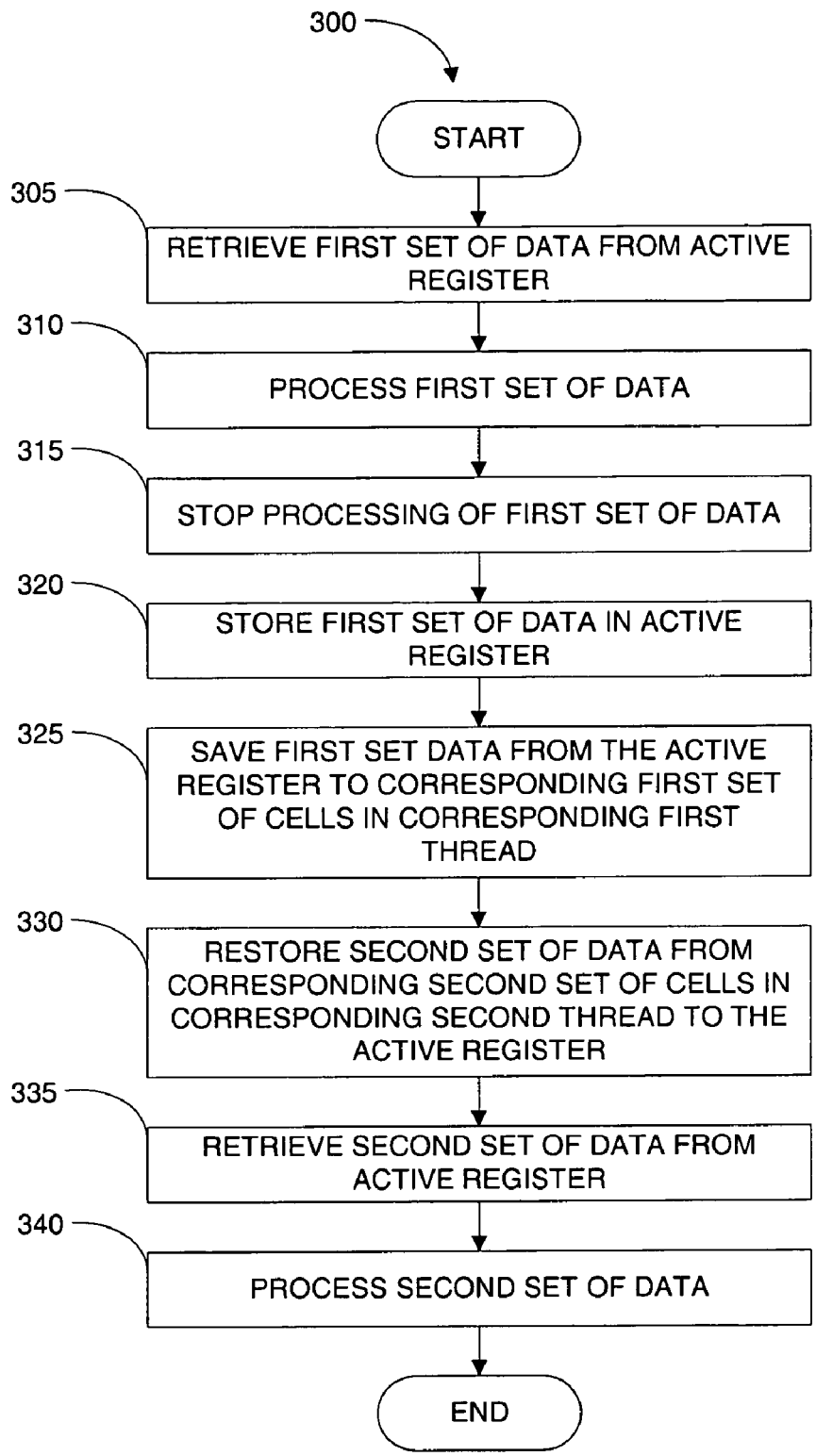
FIG. 3 is a flowchart of the method operations of the operations of the multi-thread processor, in accordance with one embodiment of the present invention.

FIG. 3 is a flowchart of the method operations 300 of the operations of the multi-thread processor 200, in accordance with one embodiment of the present invention. The multi-thread processor 200 switches between processing threads 220, 222 and 224 to perform the processing. Typically, the multi-thread processor 200 will process a first thread 220 until the first thread stalls due to needing data that is not yet available. The multi-thread processor can also interrupt processing of the first thread 220 such as due to a higher priority processing request by a second thread 222. By way of example, in an operation 305, a first set of data is retrieved from the active register 210 for processing. The processing can be in a processor (e.g., a multi-thread processor 200).

In an operation 310, the first set of data is processed until processing is stopped in an operation 315. The processing the first set of data may be stopped due to an interrupt or a stall or for some other reason (e.g., processing may be completed).

In an operation 320, the first set of data is stored in the active register 210. Storing the first set of data in the active register 210 can also include saving the first set of data from the active register to a corresponding first set of cells 220A–220n, in a corresponding first thread 220, in an operation 325.

In an operation 330, a second set of data is restored from a corresponding second set of cells 222A–222n, in a corresponding second thread 222, to the active register 210. In an operation 335, the second set of data is retrieved from the active register 210 for processing in an operation 340. The method operations can then continue to switch between threads as described above in operations 315–340.

Figure 4:
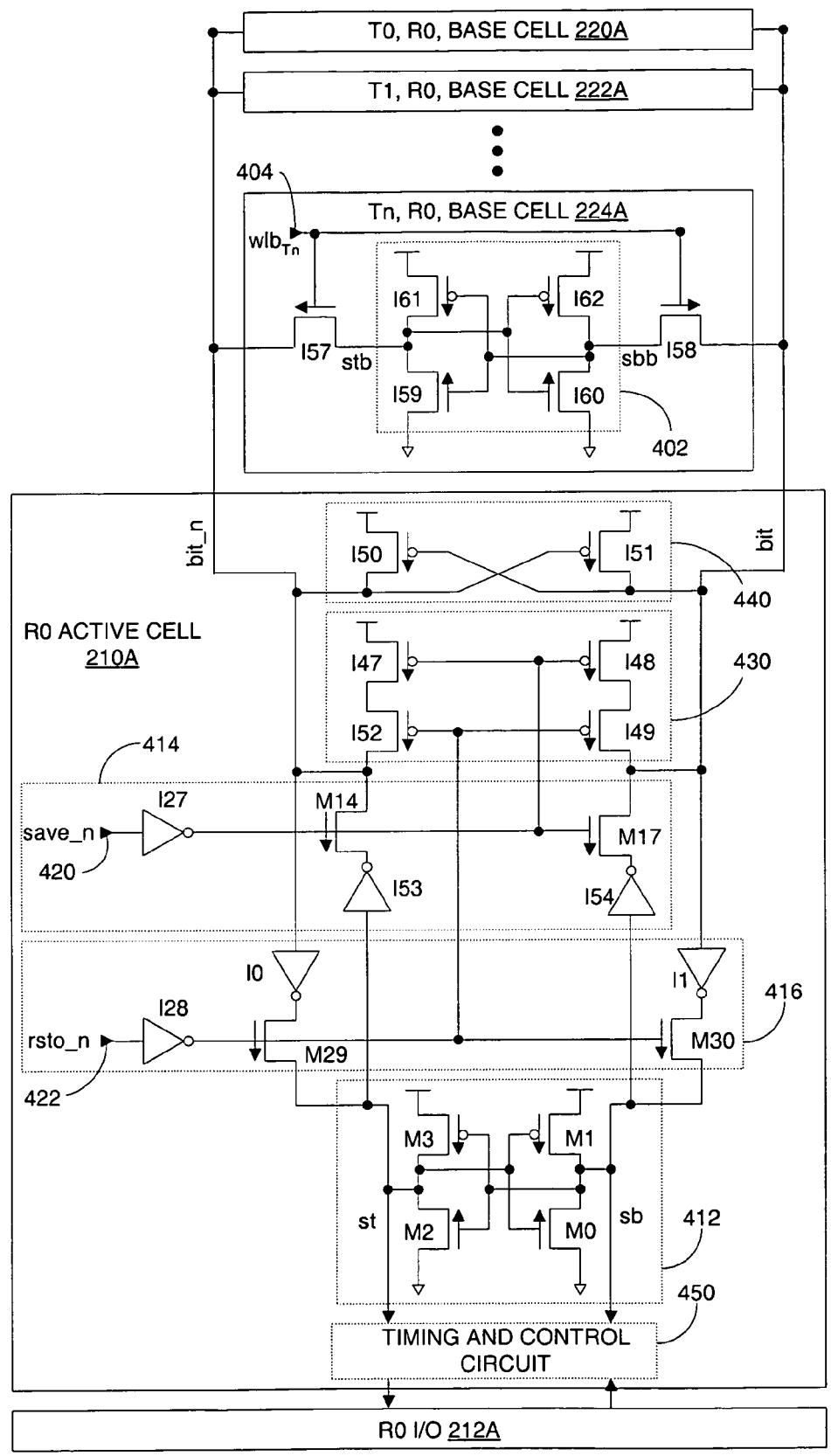
FIG. 4 is a schematic diagram of an active cell and corresponding base cells, in accordance with one embodiment of the present invention.

FIG. 4 is a schematic diagram of an active cell 210A and corresponding base cells 220A, 222A and 224A, in accordance with one embodiment of the present invention. The base cell 224A includes a storage circuit 402 as is well known in the art. It should be known that the storage circuit 402 is shown as a cross-coupled inverter structure as an exemplary structure only. The storage circuit 402 is not limited to the cross-coupled inverter structure shown. The storage circuit 402 can include any structure capable of storing data that can later be read from the structure. The cross-coupled inverter circuit includes PMOS devices I61 and I62 and NMOS devices I59 and I60 with the cross-coupled gates as shown.

The base cell 224A also includes a control signal input 404 that allows a control signal $wlb_{Tn}$ to be selectively applied to the bases of the NMOS devices I57 and I58. Applying an appropriate control signal $wlb_{Tn}$ to the gates of the NMOS devices I57 and I58 causes the NMOS devices I57 and I58 to conduct. When the NMOS devices I57 and I58 are conducting a data value can be stored in or read from the storage circuit 402.

The control signal $wlb_{Tn}$ can also be applied when a respective thread is selected. By way of example, if the Thread n (Tn) is selected then $wlb_{Tn}$ can also be applied to base cell 224A. Similarly, if the Thread 0 (T0) is selected, then a respective control signal $wlb_{T0}$ can also be applied to base cell 220A.

The active cell 210A includes a storage circuit 412. The storage circuit 412 is shown as a cross-coupled inverter circuit however, as described above in regard to the storage circuit 402, the storage circuit 412 can be any structure capable of storing data that can later be read from the structure. The cross-coupled inverter circuit of the storage circuit 412 includes PMOS devices M1 and M3 and NMOS devices M0 and M2. The gates of the PMOS devices M1 and M3 and NMOS devices M0 and M2 are cross-coupled as shown.

The active cell 210A also includes a save control circuit 414 and a restore control circuit 416. The save control circuit 414 allows the data applied to nodes sb and st to be applied to the bit lines bit and bit_n, respectively. The save control circuit 414 includes save drivers I53 and I54 and save pass gates M14 and M17. The save control circuit 414 can optionally include an inverter I27 on the save control node 420 so as to match the polarity of the control signal to the polarity of the gates of the pass gates M14 and M17. The driver I53 is coupled in series between node st and pass gate M14. Similarly, driver I54 is coupled in series between node sb and pass gate M17. The outputs of the pass gates M14 and M17 are coupled to the bit_n and bit bitlines to the base cells 220A, 222A and 224A.

The restore control circuit 416 includes restore drivers I0 and I1 and restore pass gates M29 and M30. The restore control circuit 416 can optionally include an inverter I28 on the restore control node 422 so as to match the polarity of the control signal to the polarity of the gates of the pass gates M29 and M30. The driver I0 is coupled in series between bitline bit_n and pass gate M29. Similarly, driver I1 is coupled in series between bitline bit and pass gate M30. The outputs of the pass gates M29 and M30 are coupled to the node st and node in the storage circuit 412.

The pass gates I57, I58, M14, M17, M29 and M30 only pass data signals and do not amplify the respective data signals that pass through them. The drivers I0, I1, I53 and I54 provide minimal amplification to the respective data signals that pass through them to and from the corresponding bitlines bit and bit_n. However, it should be understood that the amplification applied by the drivers I0, I1, I53 and I54 is very limited due to relative short length of the bitlines bit and bit_n. Further, the amplification applied by the drivers I0, I1, I53 and I54 can also be limited because the amplification needed is very small amount. By way of example, each of the storage circuits 402 and 412 can store a logical 1 value such as about 0.6 volts. By way of example, in a restore operation, the drivers I0 and I1 must only detect a logical high value stored in the storage circuit 402 (e.g., about 0.6 volts) and then amplify that logical high value sufficient enough to ensure that about 0.6 volts (i.e., a logical 1 value) can be stored in the storage circuit 412.

Further, very few devices are attached to the bitlines bit and bit_n and therefore the load on the drivers I0, I1, I53 and I54 is further reduced. As a result, each of the pass gates I57, I58, M14, M17, M29 and M30 and the drivers I0, I1, I53 and I54 can be relatively small devices. By way of example, the pass gates I57, I58, M14, M17, M29 and M30 and the drivers I0, I1, I53 and I54 can have device sizes approximately equal to the device size of the devices M0, M1, M2, M3, I59, I60, I61, and I62 included in the respective storage circuits 402 and 412. As a result, the over all size of the active cell 210A and the base cells 220A–224A are reduced and the length of the bitlines bit and bit_n are also reduced, as compared to prior art circuits described above.

The active cell 210A can optionally include a pre-charge and pull-up circuit 430. The pre-charge and pull-up circuit 430 includes pull-up devices I47, I48, I49 and I52. The pull-up devices I47, I48, I49 and I52 couple VCC to the bit lines bit_n and bit when the data is not being saved or restored between the storage cell 412 and any of the other storage circuits in any of the base cells 220A–224A. By way of example, when neither of the control signals save_n and rsto_n are applied to the control nodes 420 and 422, the pull-up devices I47, I48, I49 and I52 are forward biased and VCC is coupled across the pull-up devices I47 and I52 to bit line bit_n and VCC is coupled across the pull-up devices I48 and I49 to bit line bit.

The active cell 210A can also optionally include a keeper circuit 440. The keeper circuit 430 includes cross-coupled devices I50 and I51. By way of example, when a logical low voltage is present on bit line bit_n, an inverse logical voltage (i.e., a logical high voltage) should be present on the bit line bit. When the logical low voltage is present on bit line bit_n, the gate to PMOS device I51 is also pulled low, causing the PMOS device I51 to couple VCC to bit line bit.

It should be understood that the devices I47, I48, I49, I52, I50 and I51 in the pre-charge and pull-up circuit 430 and the keeper circuit 440 can have device sizes approximately equal to the device size of the devices M0, M1, M2, M3, I59, I60, I61, and I62 included in the storage circuits 402 and 412. The devices I47, I48, I49, I52, I50 and I51 can be sized due to the substantially the same reasons set out above for pass gates I57, I58, M14, M17, M29 and M30 and the drivers I0, I1, I53 and I54.

Figure 5:
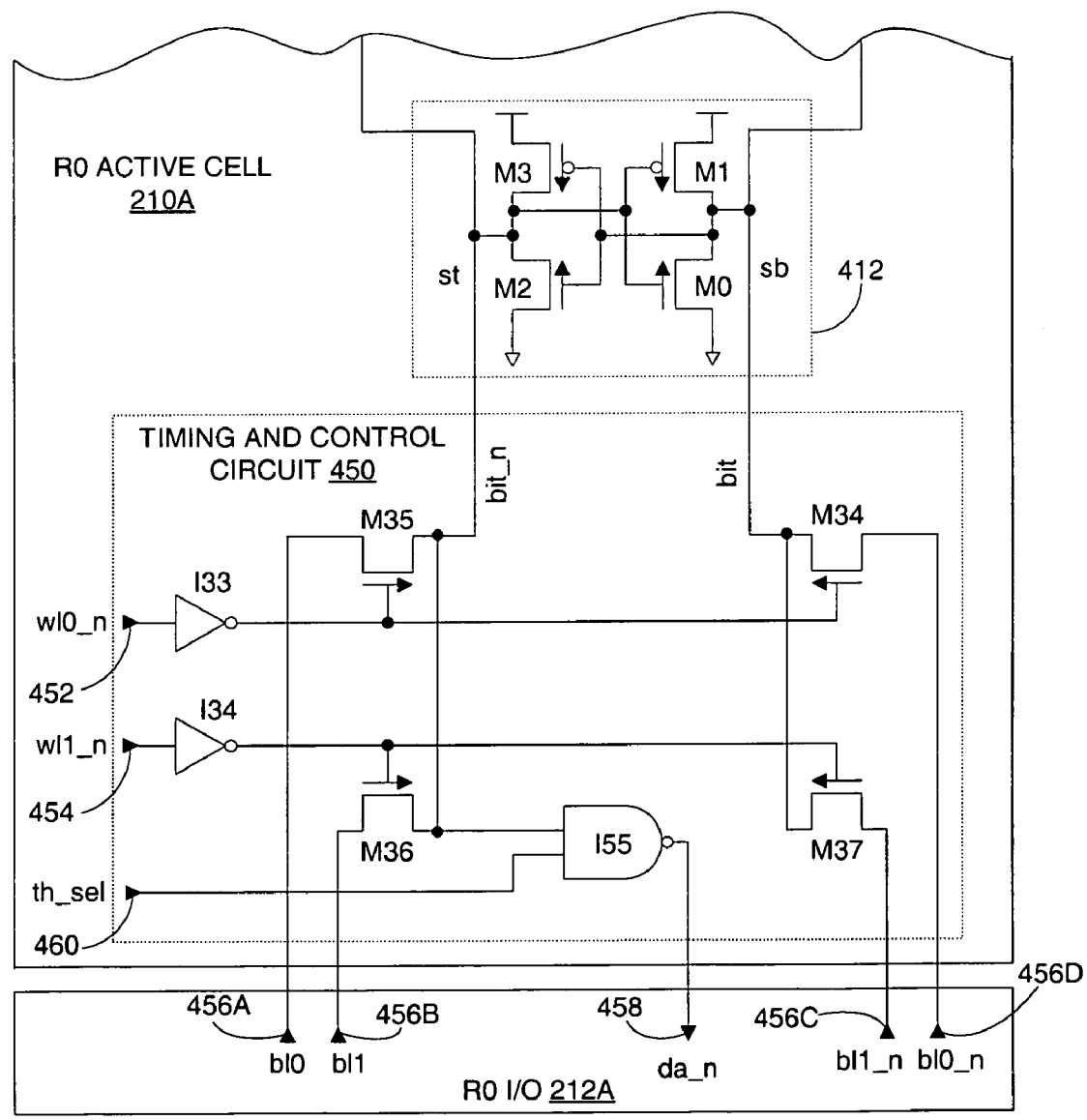
FIG. 5 is a schematic diagram of a timing and control circuit optionally included in the active cell, in accordance with one embodiment of the present invention.

FIG. 5 is a schematic diagram of a timing and control circuit 450 optionally included in the active cell 210A, in accordance with one embodiment of the present invention. The timing and control circuit 450 provides a system for controlling when data is written to or read from the storage circuit 412. Reading circuit includes a N and gate I55. Bit line bit_n and thread select control signal th_sel node 460 are coupled to two inputs of Nand gate I55. The output node 458 of the Nand gate I55 is the da_n (i.e., inverse data) of the data present on bit line bit_n (i.e., data present on node st of the storage circuit 412). Although not shown, it should be understood that the Nand gate I55 could similarly be coupled to bit line bit and thereby output the data present on bit line bit (i.e., data present on node sb of the storage circuit 412) to output node 458.

The timing and control circuit 450 also includes two write control circuits. The first write control circuit includes inverter I33 and pass gates M34 and M35. In operation, a write control signal wl0_n in applied to control node 452 of the inverter I33. The output of the inverter I33 is applied to the gates of each of the pass gates M34 and M35. When activated, pass gate M34 passes the data applied to bl0_n at node 456D to node sb of the storage cell 412 and pass gate M35 passes the data applied to bl0 at node 456A to node st of the storage cell 412.

The second write control circuit includes inverter I34 and pass gates M37 and M36. In operation, a write control signal wl1_n in applied to control node 454 of the inverter I34. The output of the inverter I34 is applied to the gates of each of the pass gates M36 and M37. When activated, pass gate M37 passes the data applied to bl1_n at node 456C to node sb of the storage cell 412 and pass gate M36 passes the data applied to bl1 at node 456B to node st of the storage cell 412.

Figure 6:
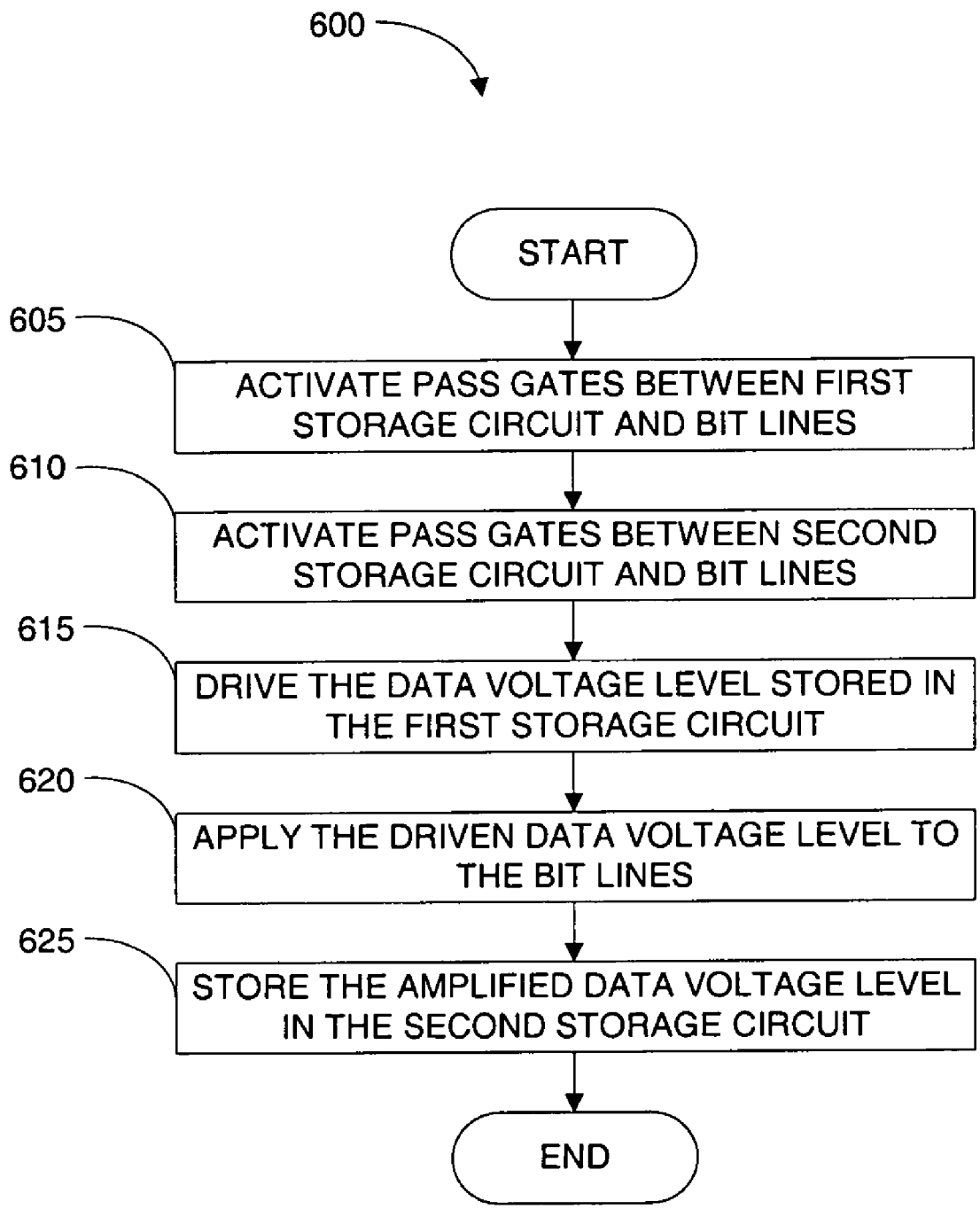
FIG. 6 is a flowchart of the method operations of a data swap operation between two storage circuits, in accordance with one embodiment of the present invention.

FIG. 6 is a flowchart of the method operations 600 of a data swap operation between two storage circuits 402 and 412, in accordance with one embodiment of the present invention. In an operation 605, the pass gates that couple a first storage circuit 402 to the bit lines bit_n and bit are activated. By way of example and as shown in FIG. 4, in a restore operation (e.g., transfer data from storage circuit 402 to storage circuit 412) pass gates I57 and I58 are activated by a wordline control signal $wlb_{Tn}$ applied to node 404.

In an operation 610, the pass gates that couple a second storage circuit 412 to the bit lines bit_n and bit are activated. Continuing the above example, a restore control signal rsto_n is applied to input node 422 of inverter 128. The output of inverter 128 activates pass gates M29 and M30.

In an operation 615, the data voltage level stored in the first storage circuit is amplified and in operation 620 the amplified data voltage level is applied to the bit lines. Continuing the above example, drivers I0 and I1 drive the data on the respective nodes stb and sbb of the first storage circuit 402 to respective bit lines bit_n and bit and to respective nodes st and sb of the second storage circuit 412.

In an operation 625, the amplified data voltage level output from the bit lines is stored in the second storage circuit. Continuing the above example, the data voltage level on the nodes st and sb are stored in the second storage circuit 412.

In an alternative example of a save operation (i.e., transferring data from the second storage circuit 412 to the first storage circuit 402), the pass gates M14 and M17 are activated by a control signal save_n applied to node 420. Pass gates I57 and I58 are activated by a wordline control signal $wlb_{T_n}$ applied to node 404. Drivers I53 and I54 drive the data on the respective nodes st and sb of the second storage circuit 412 to respective bit lines bit_n and bit and to respective nodes stb and sbb of the first storage circuit 402. The data voltage level on the nodes stb and sbb are stored in the first storage circuit 402.

As shown above, data can be transferred between an active cell 210A any one or more of multiple base cells 220A–220A that are coupled to the same bit line or bit lines. In one embodiment, four or eight or more base cells are coupled to each active cell by one or two transfer bit lines.

As described above, the data transfer drivers I0, I1, I53 and I54 and pre-charge devices I47, I48, I49 and I52 and keeper devices I50 and I51 are very small (e.g., core sized devices) and localized within the active memory cell 210A, a lot of die area is saved which reduces the overall physical size of the active cell 210A. Further, as the data transfer drivers I0, I1, I53 and I54 and pre-charge devices I47, I48, I49 and I52 and keeper devices I50 and I51 are core-sized devices, then the layout can also be simplified. By way of example, the bit lines bit_n and bit can be very short. As a result, the data can be transferred between the active cell 210A and the base cells 220A–220A in less time (i.e., faster data transfer speed).

During a save operation (i.e., swap data from active cell 210A to base cell 224A), since data is transferred thru small inverters I53 and I54, there is a parasitic read can occur which can oppose the save operation because the device sizes of the driving inverter and base cell 220A–220A are approximately the same. As a result, the 430 and 440 are used to make sure that the parasitic save operation does not occur and thereby improve the writability and provide a more robust swap operation.

In a first approach, the control signal save-n can be applied to node 420 early. By way of example, the control signal save_n can be applied to node 420 approximately two gate delays before the base cell wordline control signal $wlb_{T_n}$ is applied to node 404 so that a sufficient voltage differential is developed on bitlines bit and bit_n to obviate any parasitic read effect from storage nodes stb and sbb in base cell 224A.

In a second approach, a PMOS cross-coupled keeper circuit of PMOS I50 and I51 can be used so that transfer bitlines are not pulled low due to parasitic read. The PMOS keeper devices I50 and I51 also help during the save operation.

In a third approach, the drivers I53 and I54 and the save pass gates M14 and M17 can be sized up a slightly as compared to the NMOS pass gates I58 and I57 in base cell 224A to improve the drive strength and thereby make the save operation more robust. By way of example, the drivers I53 and I54 and the pass gates M14 and M17 can have device sizes about two or about three times larger than the pass gates I58 and I57. It should be understood that the drivers I53 and I54 and the save pass gates M14 and M17 can be sized according to the length of the bit lines bit_n and bit and the number of base cells 220A–220A that are coupled to the bit lines bit_n and bit. By way of example, if the length of the bit lines bit_n and bit is very small then drivers I53 and I54 and the save pass gates M14 and M17 can be sized approximately the same size as the pass gates I58 and I57 and the other devices in the storage circuits 402 and 412.

During a restore operation (i.e., data swap from base cell 220A–220A to active cell 210A), there is no conflict between the parasitic read and write as storage nodes st and sb in active cell discharge path are blocked during restore since th_sel is not asserted.

Figure 7A:
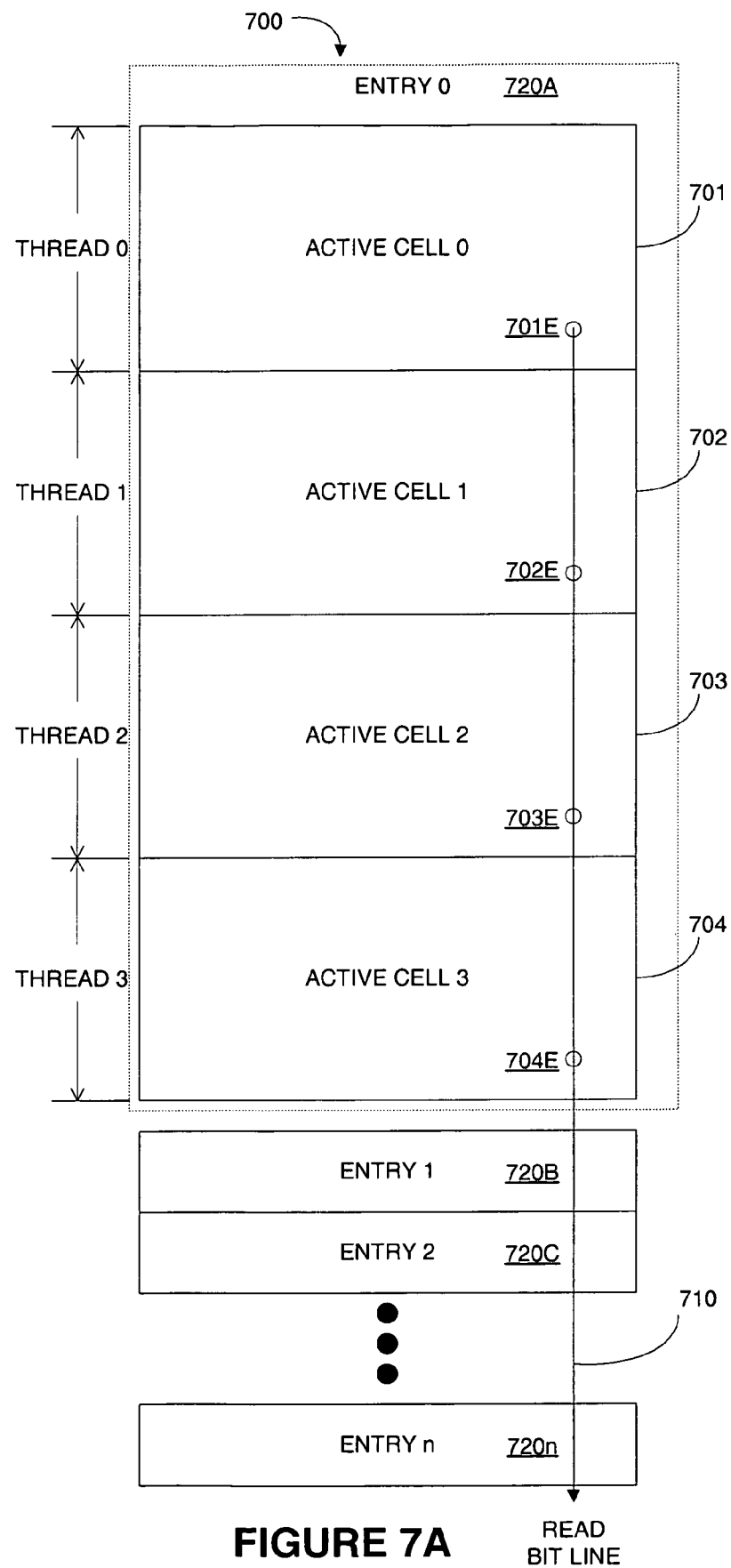
FIG. 7A is a block diagram of a multi-thread memory system, in accordance with one embodiment of the present invention.

One or more of the above-described embodiments provide a system and a method for swapping-data between the base cells and the active cells. However, the data must still be output (i.e., read) from the active cell to be used (e.g., processed in the processor). FIG. 7A is a block diagram of a multi-thread memory system 700, in accordance with one embodiment of the present invention. The typical read scheme 700 includes multiple active cells 701E, 702E, 703E and 704E corresponding to each of thread 0, thread 1, thread 2 through thread n (i.e., where n=3 for a four thread) multithread memory system. Four threads are illustrated as an exemplary embodiment and it should be understood that more or fewer than four threads could also be used. Each of multiple memory entries 720A–720n include corresponding multiple threads and active cells. The read bit line 710 is coupled to each of the active cells in each of the multiple memory entries 720A–720n.

Figure 7B:
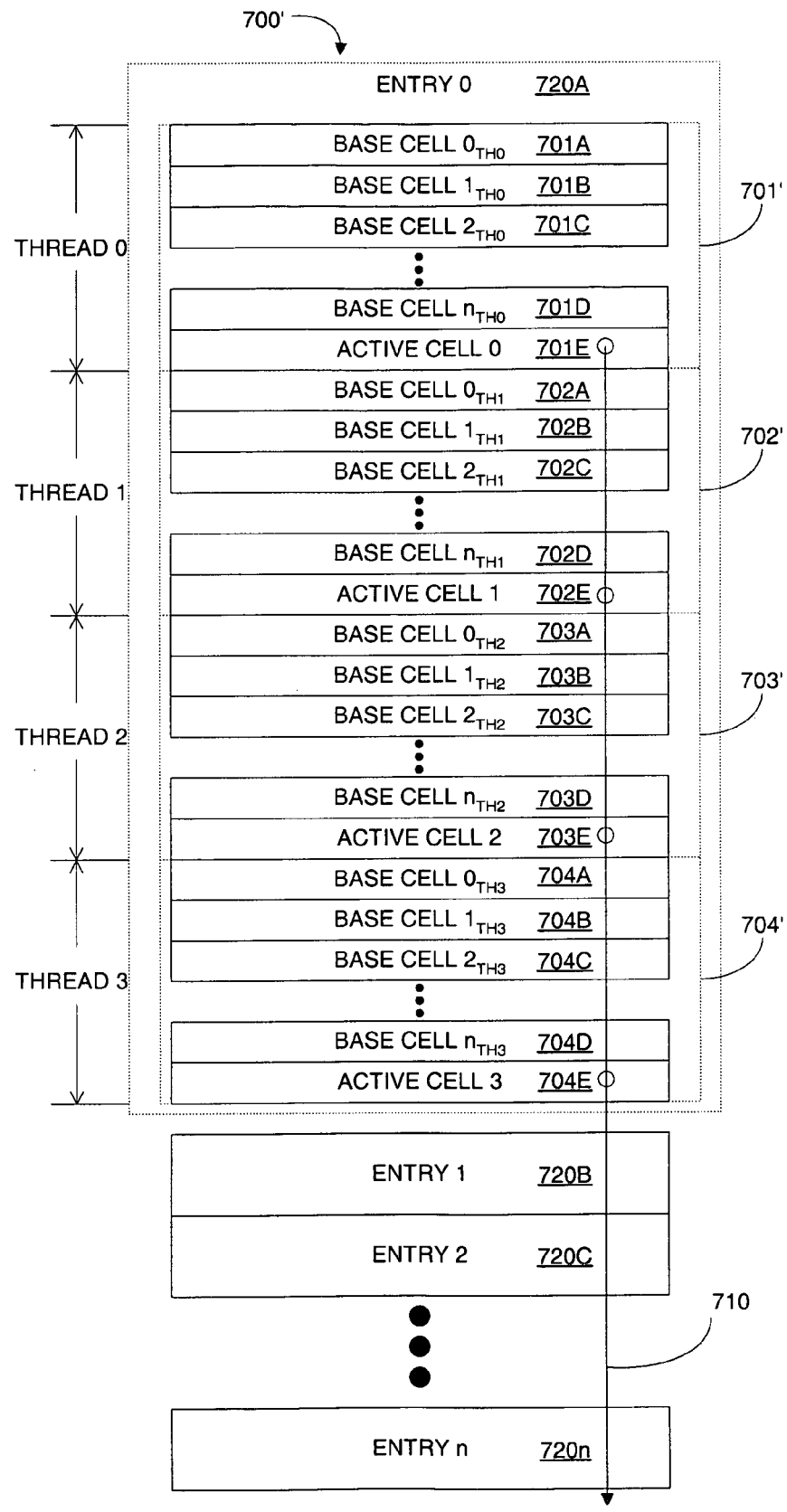
FIG. 7B is a block diagram of a multi-thread memory system, in accordance with one embodiment of the present invention.

FIG. 7B is a block diagram of a multi-thread memory system 700', in accordance with one embodiment of the present invention. The multi-thread memory system 700' includes multiple active cells 701E, 702E, 703E and 704E for each of thread 0, thread 1, thread 2 through thread n (i.e., where n=3 for a four thread) multithread memory system. Each of the multiple active cells 701E, 702E, 703E and 704E can be coupled to corresponding base cells 701A–D, 702A–D, 703A–D, and 704A–D such as described above in FIGS. 2–6.

Figure 8A:
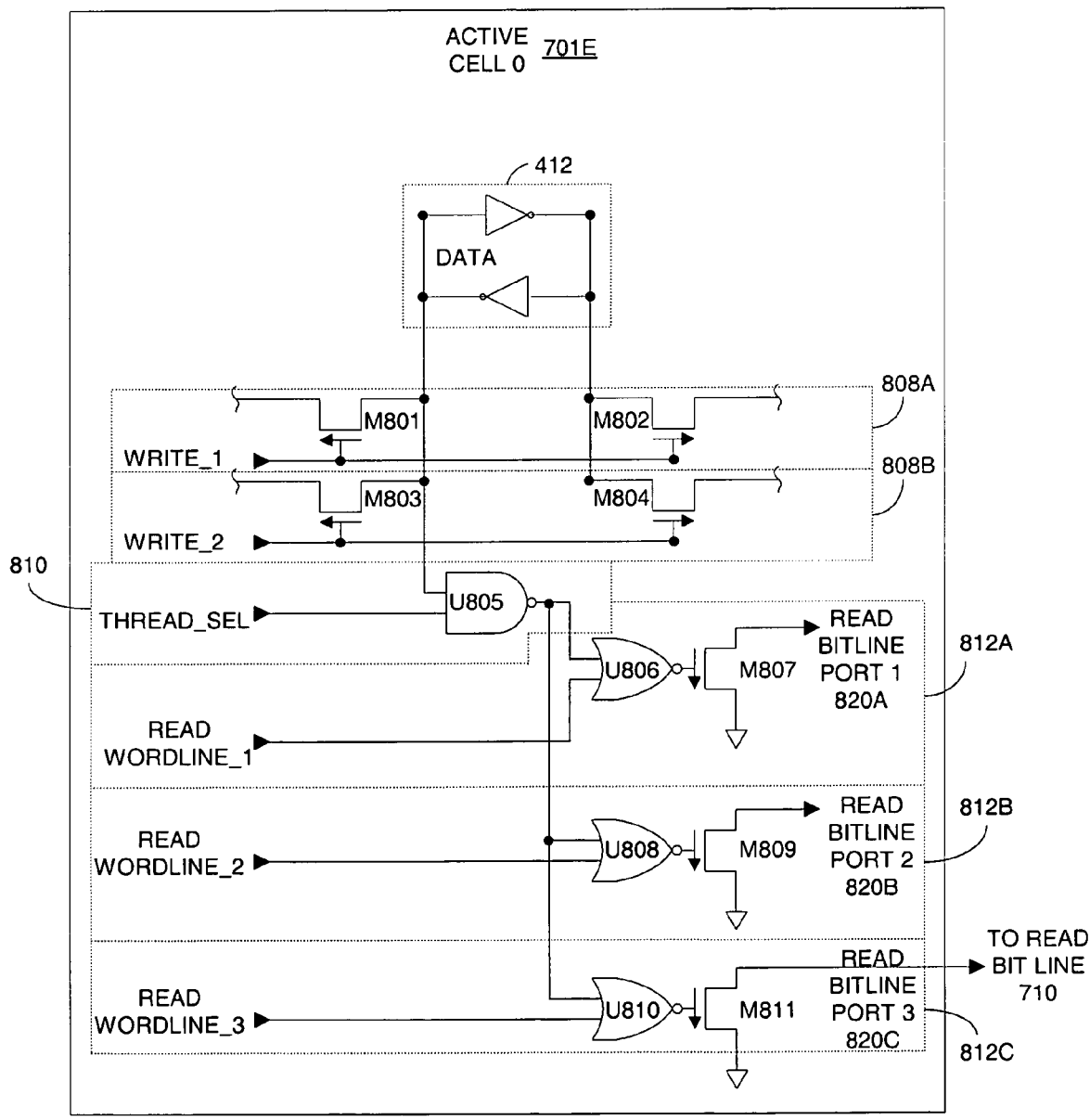
FIG. 8A shows a more detailed block diagram of entry, in accordance with one embodiment of the present invention.
Figure 8B:
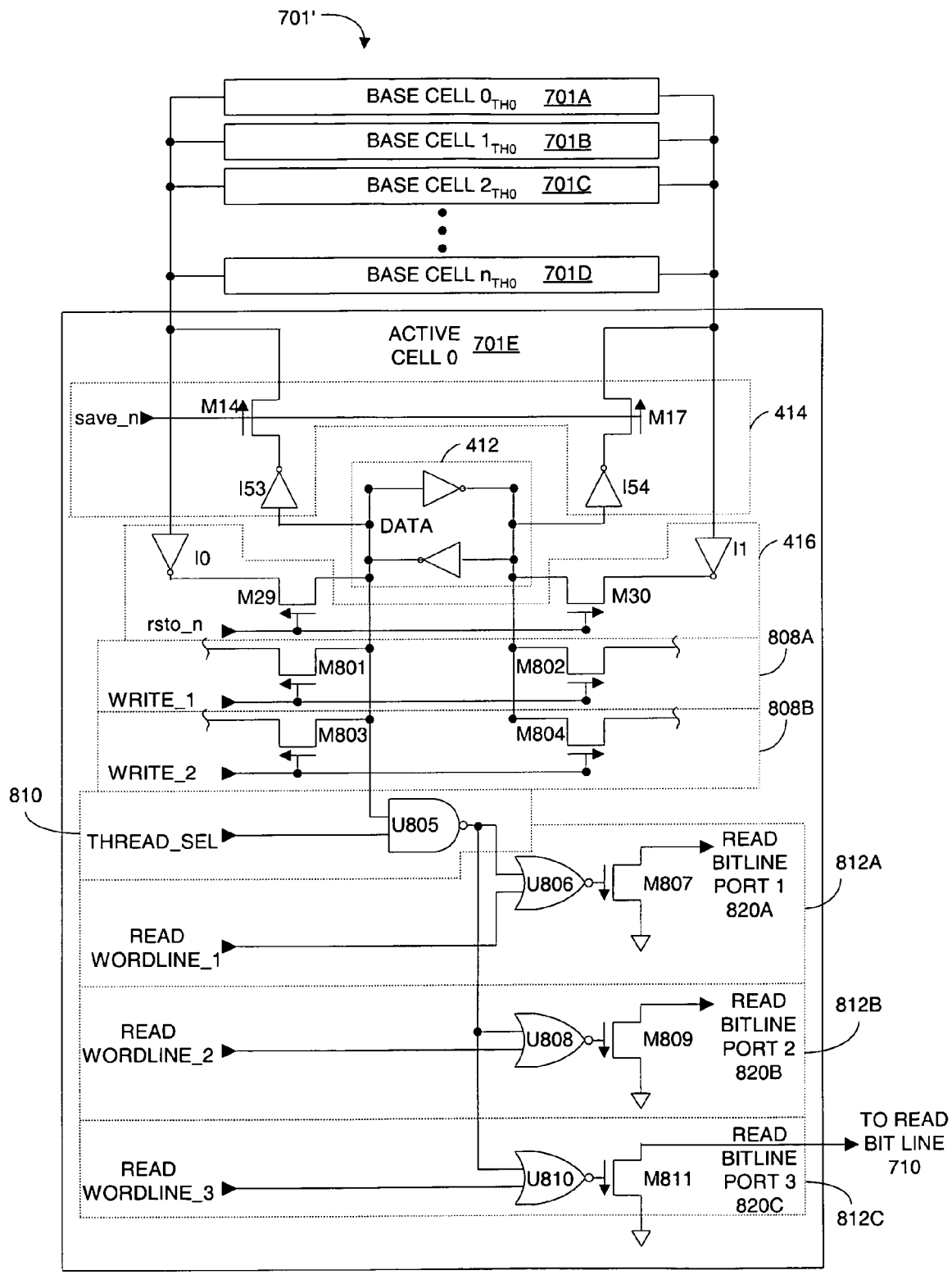
FIG. 8B shows a more detailed block diagram of entry, in accordance with one embodiment of the present invention.

FIG. 8A shows a more detailed block diagram of entry 701, in accordance with one embodiment of the present invention. Similarly, FIG. 8B shows a more detailed block diagram of entry 701', in accordance with one embodiment of the present invention. As shown, in FIGS. 8A and 8B each of active cell 701E and 701E' include a thread select circuit 810, and three output pot select circuits: read wordline_1 circuit 812A, read wordline_2 circuit 812B and read wordline_3 circuit 812C.

Referring again to FIGS. 7A and 7B, the multi-thread memory systems 700 and 700' typically include sixteen entries 720A, 720B, 720C through 720n. Typically, the multi-threaded register includes four threads (e.g., as shown), however, the multithreaded register could have more or less than four threads. If the multi-threaded register includes four threads and each active cell has a read wordline for each the output ports and a thread select, then the total number of read signals needed for the 16 entries 720A, 720B, 720C through 720n is:

(16 entries)×(4 threads)×(3 word lines+1 thread select control line)=256

As each of the 256 conductive tracks have a minimum physical size (width) of about 0.8 micron then the 256 conductive tracks have a minimum total width of about 204.8 micron. As a result, the minimum size of the each of read scheme 700 and 700' cannot be smaller than the area required for the 256 conductive tracks.

Unfortunately, in addition to area consumed by the 256 conductive tracks the physical size of some of the devices that form the multi-thread memory systems 700 and 700' can also impact the area consumed by the multi-thread memory systems 700 and 700'. By way of example, referring again to FIG. 7A above, the read bit line 710 is coupled to each of the active cells 701E–704E in each of the threads in each of sixteen entries 720A–720n. As a result, the read bit line 710 is coupled to a minimum of 64 devices (i.e., one device for each of the read line ports that the bit line 710 is coupled to (restated: (16 entries)×(4 devices in each entry)=64 devices).

By way of example and referring to FIG. 8A, the read bit line port 3 820C is coupled to the read bit line 710. The M811 device must be sized to pull-up (or pull-down) the entire read bit line 710 to communicate the data being output from the OR gate U810. As is well known in the art, each of the devices coupled to a data line (e.g., bit line 710) adds a parasitic load to the data line due to parasitic losses, leakage current and other causes. As described above, there are 64 devices coupled to the read bit line 710. These parasitic loads must be overcome by each of the 64 devices coupled to the bit line 710. As a result, each of these 64 devices must be physically large enough to handle the current load required to overcome the parasitic loads on the bit line 710. By way of example, OR gates U806, U808, U810 and the output MOS devices M807, M809 and M811 have device sizes about 10 times the size of the devices that from the storage cell 412. Specifically, in a 0.3 micron device structure, where the devices in the storage cell 412 have device widths of about 0.3 micron, the OR gates U806, U808, U810 and the output MOS devices M807, M809 and M811 have device sizes of about 3.0 to about 5.0 micron. As a result, the size of the each of read schemes 700 and 700' cannot be is further enlarged by the large device sizes of the OR gates U806, U808, U810 and the output MOS devices M807, M809 and M811.

Figure 9:
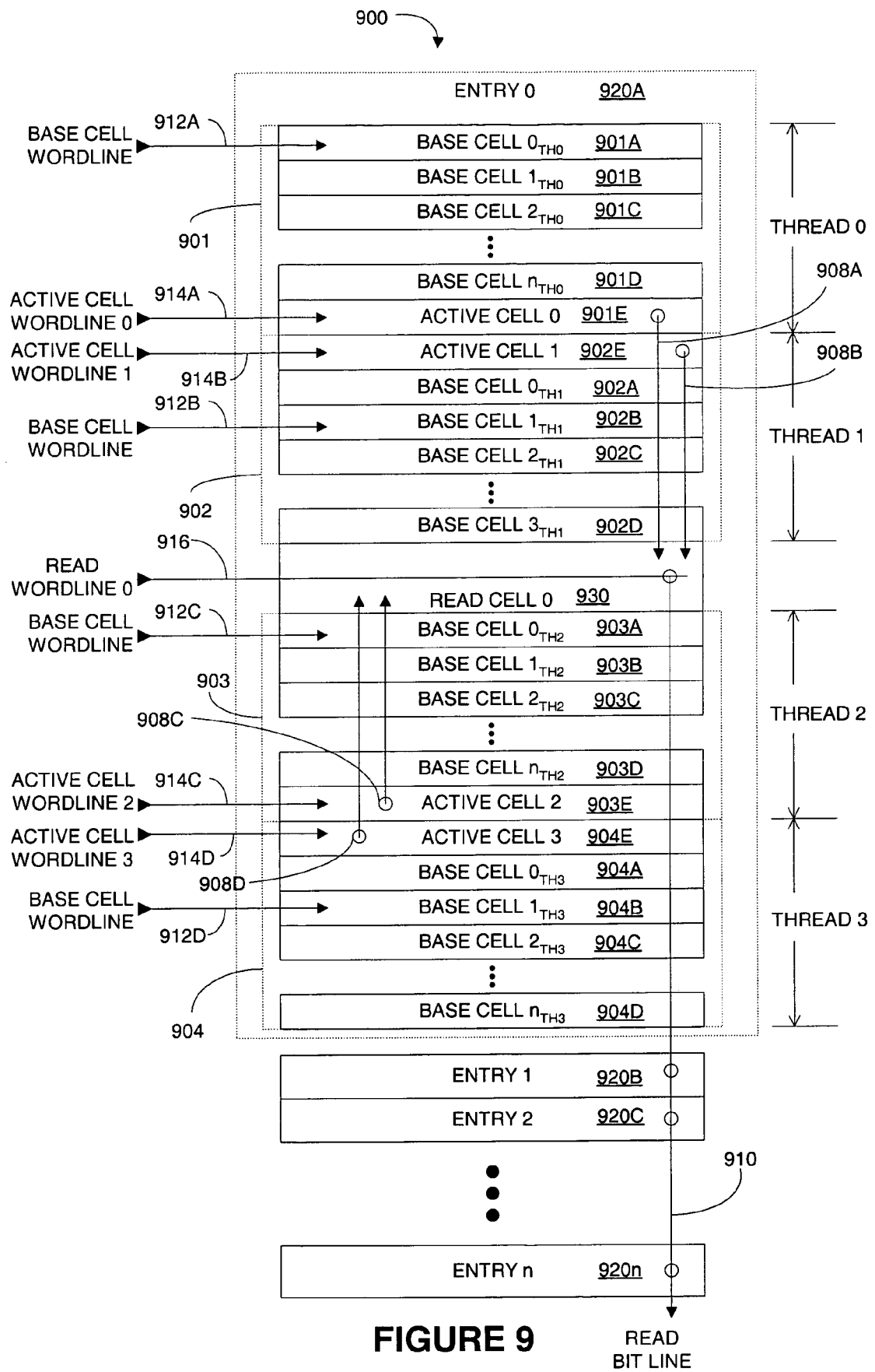
FIG. 9 is a block diagram of a multi-thread memory system, in accordance with one embodiment of the present invention.
Figure 10:
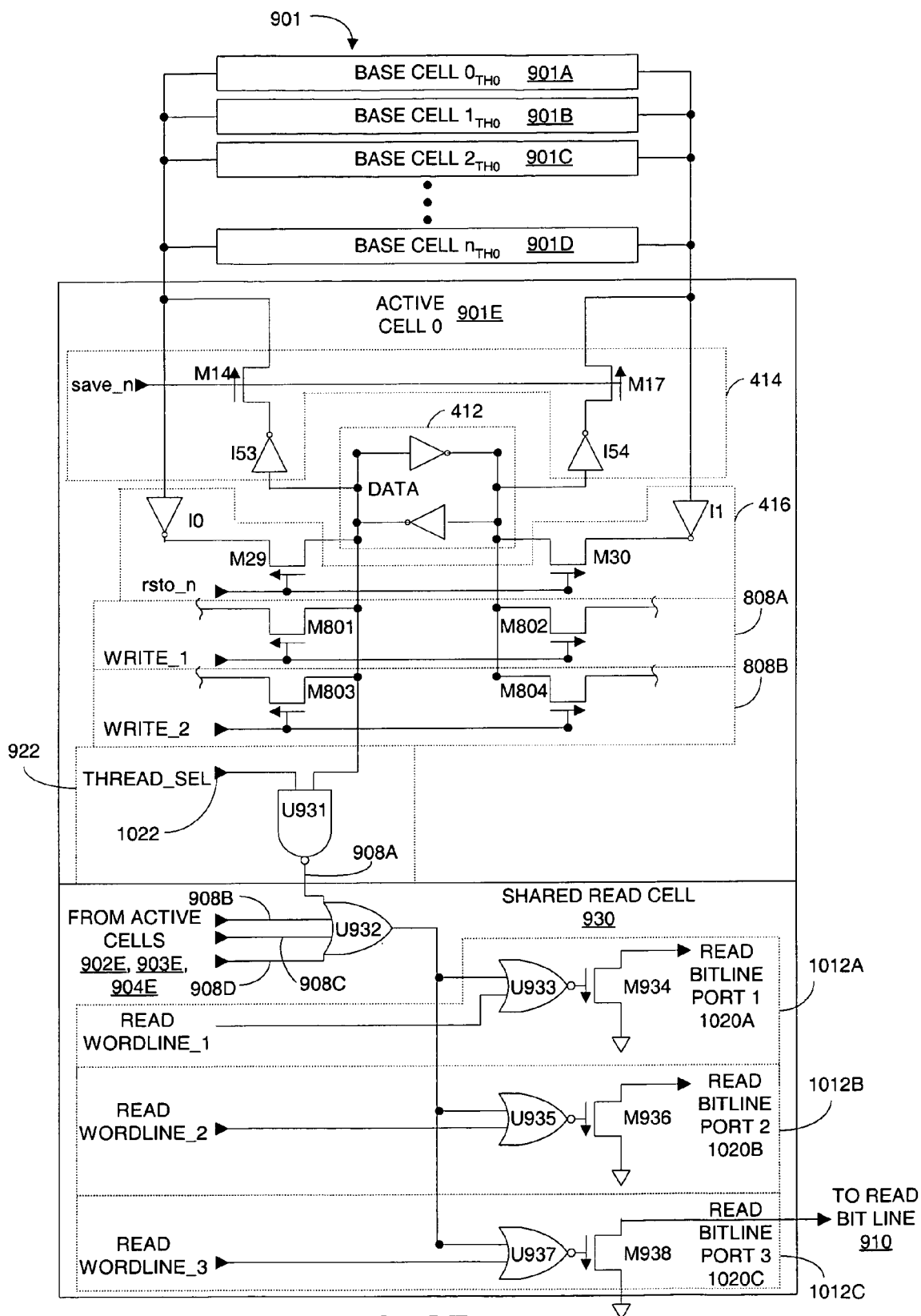
FIG. 10 shows a more detailed block diagram of thread 0 and the shared read cell, in accordance with one embodiment of the present invention.

One embodiment of the present invention reduces the number of conductive tracks required for the read schemes through use of a shared read cell. The reduced number of conductive tracks allows the overall size of the shared read cell scheme to be much smaller than comparable capacity multi-thread memory systems 700 and 700'. In one embodiment, the shared read cell scheme requires only 112 conductive tracks as compared to 256 conductive tracks for the comparable capacity read schemes 700 and 700'. Referring now to FIGS. 9 and 10 below, if the multi-threaded register 900 with a shared read cell 930 includes four threads (Thread 0-Thread 3) then each of the active cells 901E, 902E, 903E and 904E includes a respective thread select (e.g., thread select 1022 for active cell 901E) and each shared read cell 930 has a read wordline for each of the output ports 1020A–1020C, then the total number of read signals needed for the 16 entries 920A through 920n is:

(16 entries)×(3 word lines+4 thread select control lines)=112 tracks

Further, the shared read cell scheme reduces the number of devices coupled to the read bit line which thereby allows the size of the output devices that pull-up (or pull-down) the read bit line to be similarly reduced. As a result, the shared read cell scheme can be more compact than comparable capacity multi-thread memory systems 700 and 700'. The more compact size of the shared read cell scheme further reduces the length of the read bit line which further reduces the parasitic load on the read bit line which allows still further reduction in the size of the output devices connected to the read bit line. As the size of the devices coupled to the read bit line and the bit line itself are reduced, the bit line can switch states faster, thereby allowing faster data transmission across the bit line.

FIG. 9 is a block diagram of a multi-thread memory system 900, in accordance with one embodiment of the present invention. The multi-thread memory system 900 includes four threads (Thread 0, Thread 1, Thread 2 and Thread 3) although it should be understood that more (e.g., 6, 8, 16, etc.) or fewer (e.g., 2, 3) threads could also be used. Typically, the multi-thread memory system 900 includes about 16 entries 920A–920n, however, it should be understood that more or fewer than 16 entries could be included. The multi-thread memory system 900 is also shown to include multiple base cells (e.g., base cells 901A–901D) coupled to a respective active cell (e.g., active cell 901E). The base cells 901A–901D, 902A–902D, 903A–903D and 904A–904D are coupled to and operate with the respective active cell 901E, 902E, 903E and 904E as described above in FIGS. 2–6. It should be understood that the principles described below can be used with or without base cells 901A–901D coupled to the active cells 901E, 902E, 903E and 904E.

Each of the active cells 901E, 902E, 903E and 904E have a respective output 908A, 908B, 908C and 908D coupled to a shared read cell 930. The shared read cell 930 has a single output coupled to the read bit line 910. As a result, each of the entries 920A through 920n in the multi-thread memory system 900 are coupled to the read bit line 910 by a single output device. In this manner, the number of output devices coupled to the read bit line 910 is substantially reduced as compared to the multi-thread memory systems 700 and 700' as described above in FIGS. 7A–8B. Restated: (16 entries)×(1 device in each entry)=16 devices coupled to the read bit line 910.

FIG. 10 shows a more detailed block diagram of thread 0 901 and the shared read cell 930, in accordance with one embodiment of the present invention. The active cell 901E includes a storage circuit 412 and one or more write circuits 808A and 808B. If one or more base cells 901A–901D are coupled to the active cell 901E, then the active cell 901E includes a save circuit 414 and a restore circuit 416 as described above in FIG. 4.

The logic level stored in the storage cell 412 is also applied to a first input of the NOR gate U931. A respective thread select signal is coupled to the second input of NOR gate U931. The logic level stored in the storage cell 412 can be read from the active cell 901E by applying the respective thread select signal to the second input of NOR gate U931. The output signal from the active cell 901E is output on bit line 908A to the shared read cell 930.

Referring again to FIG. 9, Threads 1–3 902–904 are substantially similar to that Thread 901. The respective outputs of Threads 1–3 902–904 are output to the shared read cell 930 via respective bit lines 908B–908D.

Referring again to FIG. 10, the shared read cell includes an OR gate U932. OR gate U932 has an input for each of the multiple active cells 901E, 902E, 903E and 904E. As shown the OR gate U932 has four inputs, however more or fewer than four inputs could be used. The output of the OR gate U932 is coupled to a respective first input of each of read bit line output NOR gates U933, U935 and U937. Read wordline_1 through Read wordline_3 are coupled to each of a respective second input of each of read bit line output NOR gates U933, U935 and U937.

Figure 11:
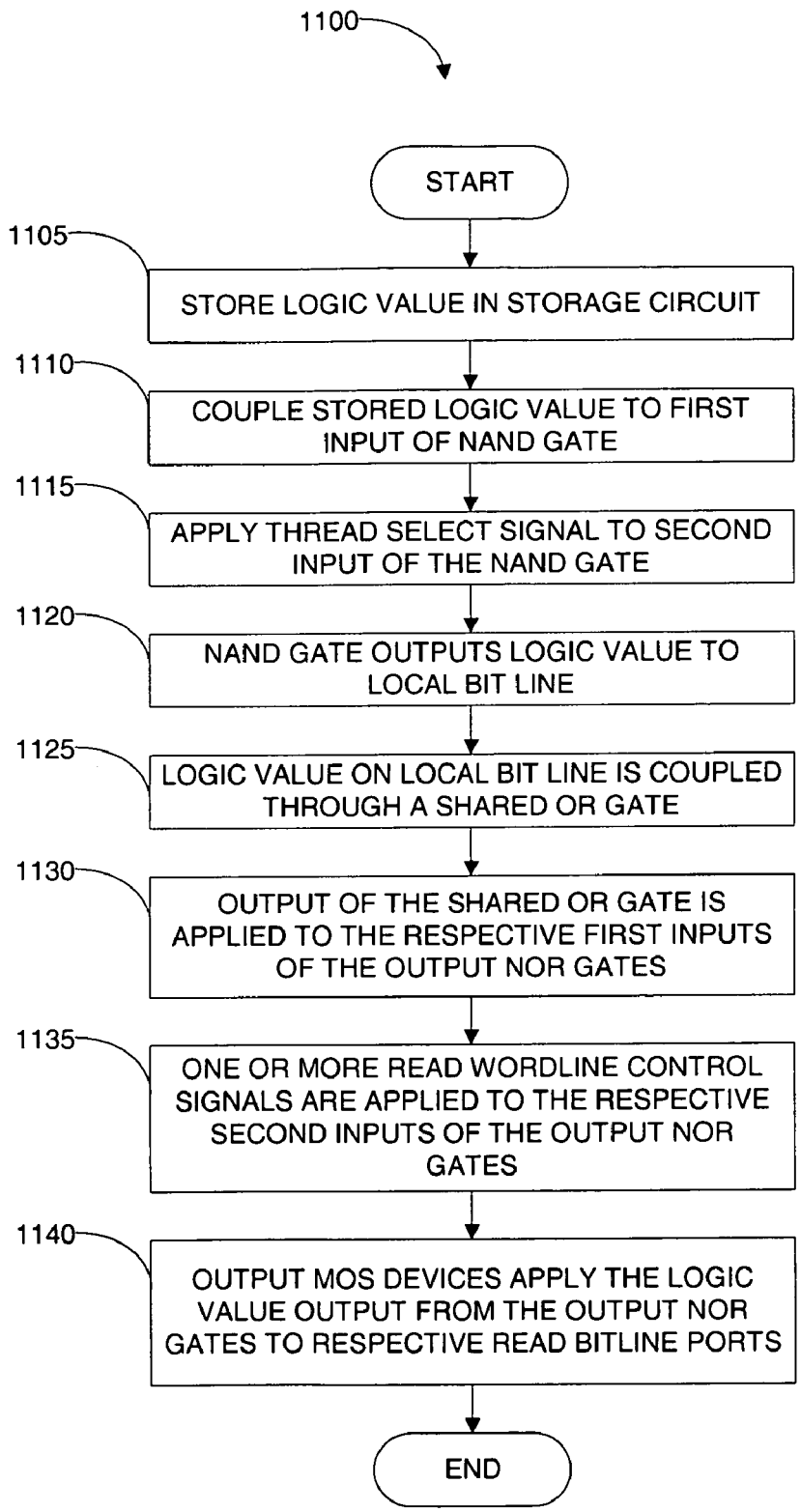
FIG. 11 is a flowchart of the method operations of the active cell and shared read cell, in accordance with one embodiment of the present invention.

FIG. 11 is a flowchart of the method operations 1100 of the Active cell 901E and shred read cell 930, in accordance with one embodiment of the present invention. In an operation 1105, a logic value is stored in the storage circuit 412.

In an operation 1110, the stored logic value is coupled from the storage circuit 412 to the first input of thread select NOR gate U931. In an operation 1115, a thread select signal is applied to a second input of thread select NOR gate U931. Applying the thread select signal to the second input of thread select NOR gate U931 causes the NOR gate U931 to communicate and invert the logic value coupled from the storage circuit 412.

In an operation 1120, NOR gate U931 outputs the inverted logic value to the local bit line 908A. In an operation 1125, the inverted logic value from local bit line 908A is output through shared OR gate U932. The addition of the shared OR gate U932, as compared to the active cell 701E described in FIGS. 7A-8B, causes an additional gate delay and a slightly more complex circuit design. However, this marginal increase in complexity is offset by the benefits described above (e.g., faster switching read bit line 910, fewer conductive tracks, smaller overall area, etc.)

In an operation 1130, the output of the shared OR gate U932 is applied to the respective first inputs of the output NOR gates U933, U935 and U937. In an operation 1135, one or more read wordline control signals (e.g., wordline_1 through wordline_3) are applied to respective second inputs of the output NOR gates U933, U935 and U937 to cause the output NOR gates U933, U935 and U937 to output the logic value.

In an operation 1140, the output MOS devices M934, M936 and M938 apply the logic value output from the output NOR gates U933, U935 and U937 to respective read bitline ports 1020A-1020C. By way of example, the read bitline port 1020C can apply the logic value to read bit line 910 and the method operations can end.

The multi-thread memory system 900 described above in FIGS. 9-11 provides a multi threaded register file with smaller area and faster switching speed than the multi-thread memory systems 700 and 700' described above in FIGS. 7A-8B. Recall that, the pitch of each conductive track that forms each of the wordlines and the thread select control lines is about 0.8 micron. The 256 conductive tracks required a total of about 204.8 micron for the multi-thread memory systems 700 and 700'. In contrast, the multi-thread memory system 900 with the shared read cell 930, requires only 112 conductive tracks and therefore needs only about 89.60 micron to accommodate the wordlines and the thread select lines.

Figure 12:
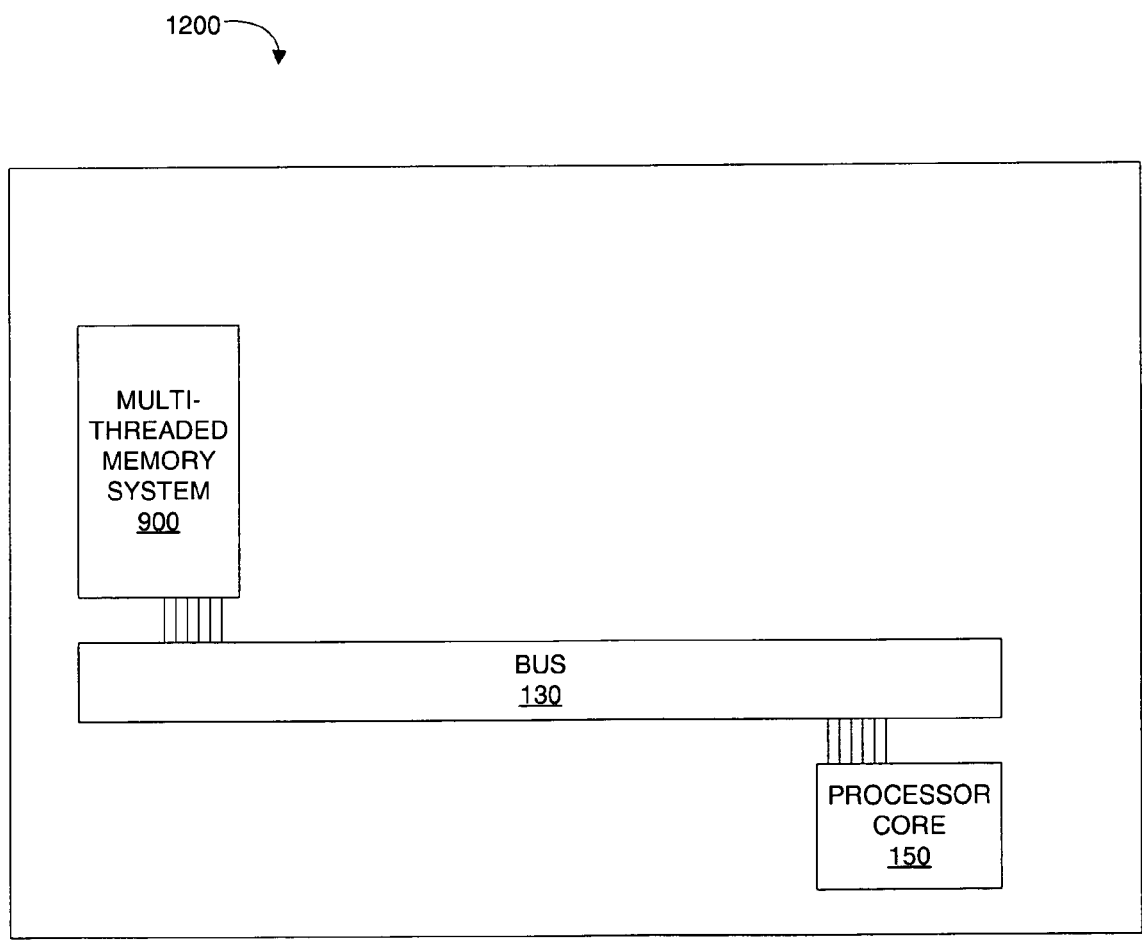
FIG. 12 is a block diagram of a multi-thread processor, in accordance with one embodiment of the present invention.

FIG. 12 is a block diagram of a multi-thread processor 1200, in accordance with one embodiment of the present invention. The multi-thread processor 1200 includes a processor core 150 that is coupled to a bus 130. A multi-threaded memory system 900 is also coupled to the bus.

As used herein in connection with the description of the invention, the term "about" means +/−10%. By way of example, the phrase "about 250" indicates a range of between 225 and 275. With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A multi-threaded memory system comprising:
   a plurality of entries, each one of the plurality of entries including:
      a plurality of threads, each one of the plurality of threads including an active cell; and
      a shared read cell having an output coupled to a read bit line and a corresponding plurality of inputs coupled to an output of the corresponding active cells in each one of the plurality of threads;
      wherein the active cell is coupled to the corresponding input of the shared read cell through a thread select circuit and wherein the output of the thread select circuit is coupled to the corresponding input of the shared read cell and wherein the thread select circuit includes a two input gate and wherein the output of the active cell is coupled to a first input of the gate and a thread select signal is coupled to a second input of the gate.

2. The multi-threaded memory system of claim 1, further comprising one or more base cells coupled to the active cell.

3. The multi-threaded memory system of claim 1, wherein the plurality of threads includes at least four threads.

4. The multi-threaded memory system of claim 1, wherein the shared read cell includes a gate having an output coupled to a read bit line and a corresponding plurality of inputs coupled to an output of the corresponding active cells in each one of the plurality of threads.

5. The multi-threaded memory system of claim 1, wherein the output of the shared read cell is coupled to one or more read bit lines through one or more output devices.

6. The multi-threaded memory system of claim 5, wherein each one of the one or more output devices include a two input read bit line select gate and the output of the shared read cell is applied to a first one of the inputs on the read bit line select gate.

7. The multi-threaded memory system of claim 6, wherein a read bit line select signal is coupled to a second one of the inputs on the read bit line select gate.

8. A microprocessor comprising:
a processor core;
a bus coupled to the processor core; and
a multi-threaded memory system coupled to the bus, the multi-threaded memory system comprising:
  a plurality of entries, each one of the plurality of entries including:
    a plurality of threads, each one of the plurality of threads including an active cell; and
  a shared read cell having an output coupled to a read bit line and a corresponding plurality of inputs coupled to an output of the corresponding active cells in each one of the plurality of threads, wherein the output of the shared read cell is coupled to one or more read bit lines through one or more output devices and, wherein each one of the one or more output devices include a two input read bit line select gate and the output of the shared read cell is applied to a first one of the inputs on the read bit line select gate.

9. A method of reading a logic value from an active cell in a multi-threaded memory system comprising:
storing a logic value in the active cell, the active cell being included in one of a plurality of threads included in each one of a plurality of entries;
applying the stored logic value in the active cell to a corresponding input of a shared read cell, wherein the shared read cell includes an input for each active cell in each of the plurality of threads in the corresponding one of the plurality of entries; and
outputting the stored logic value from the shared read cell to an output circuit;
wherein the active cell is coupled to the corresponding input of the shared read cell through a thread select circuit and wherein the output of the thread select circuit is coupled to the corresponding input of the shared read cell and wherein the thread select circuit includes a two input gate and wherein the output of the active cell is coupled to a first input of the gate and a thread select signal is coupled to a second input of the gate.

10. The method of claim 9, further comprising receiving a thread select signal in the second input of the gate.

11. The method of claim 9, wherein the shared read cell includes a gate having an output coupled to a read bit line and a corresponding plurality of inputs coupled to an output of the corresponding active cells in each one of the plurality of threads.

12. The method of claim 11, wherein the output of the shared read cell is coupled to one or more read bit lines through one or more output devices.

13. The method of claim 12, wherein each one of the one or more output devices include a two input read bit line select gate and the output of the shared read cell is applied to a first one of the inputs on the read bit line select gate.

14. The method of claim 13, wherein a read bit line select signal is coupled to a second one of the inputs on the read bit line select gate.

15. The method of claim 14, further comprising receiving a read bit line select signal to the second one of the inputs on the read bit line select gate.

* * * * *